Sept. 30, 1947.  V. G. PADGETT  2,428,238
WEDGING DEVICE
Filed Oct. 3, 1946
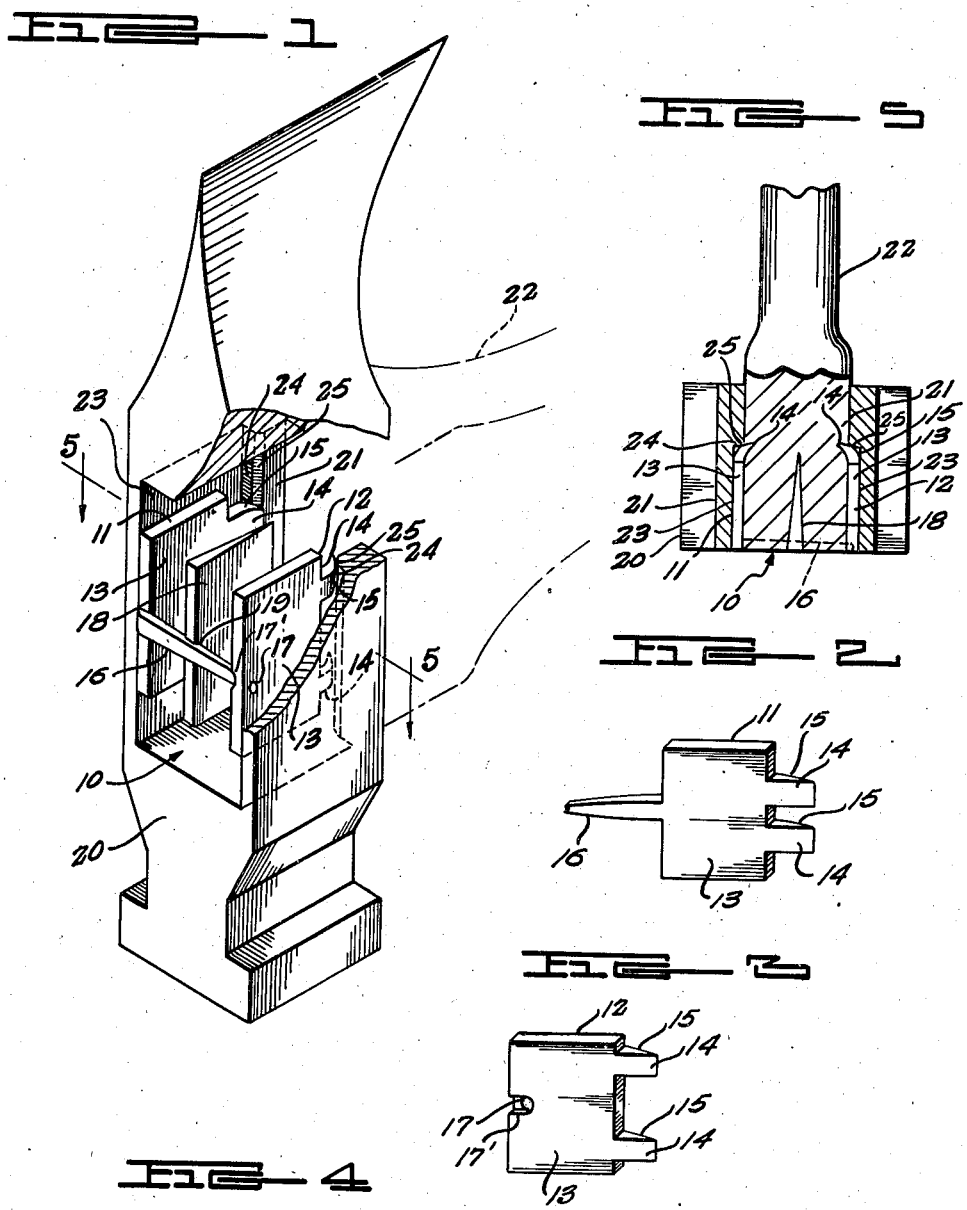
Inventor
VERNIE G. PADGETT
By 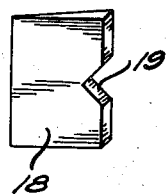
Attorneys

UNITED STATES PATENT OFFICE 2,428,238

WEDGING DEVICE

Vernie G. Padgett, Eldorado, Ill., assignor of thirty-three and one-third per cent to Obe Roberts, Eldorado, Ill.

Application October 3, 1946, Serial No. 700,921

1 Claim. (Cl. 306—33)

This invention relates to new and useful improvements and structural refinements in wedging devices, and the principal object of the invention is to provide a device of the character herein described, such as may be conveniently and effectively employed for firmly securing the head of tools, such as hammers, axes, and the like, to the handle thereof, in order to prevent accidental or unintentional separation of the same.

A further object of the invention is to provide a wedging device which may be universally applied to various sizes and types of tools.

Another object of the invention is to provide a wedging device which may be easily and quickly installed in position.

An additional object of the invention is to provide a wedging device which is simple in construction, dependable in operation, and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a perspective view of the invention;

Figure 2 is a perspective view of one of the side plates;

Figure 3 is a perspective view of another side plate;

Figure 4 is a perspective view of a wedge plate; and

Figure 5 is a cross-sectional view, taken substantially in the plane of the line 5—5 in Figure 1.

Like characters of reference are used to designate like parts in the specification and throughout the several views.

Referring now to the accompanying drawings in detail, the invention consists of a wedging device designated generally by the reference character 10, the same embodying in its construction a pair of side plates 11 and 12, these being substantially similar in configuration and each consisting of a rectangular body 13 provided at one edge thereof with a pair of inturned teeth 14.

These teeth are disposed in a spaced relation on each of the bodies 13 and it will be noted that the inturned configuration of the teeth results in the formation of cam-like surfaces 15.

The body 13 of the plate 11 is formed with a prong 16, while the body of the plate 12 is provided with an aperture 17. A portion of the body adjacent the aperture 17 is relieved to provide a recess 17', hereinafter to be more particularly described.

The invention also embodies in its construction a wedge plate 18, this being tapered as shown, and being formed in its major edge or end with a V-shaped recess 19.

The tool head 20 is provided with the usual eye 21 to receive the end portion of a suitable handle 22 and the opposed sides of the eye in the head 20 are formed with a pair of recesses 23.

The recesses 23 do not extend the full length, so to speak, of the eye 21, and terminate at the inner end thereof in flat end walls 24, provided with chamfered edge portions 25.

When the invention is placed in use, the handle 22 is inserted into the eye 21 in the conventional manner. Thereupon, the side plates 11 and 12 are inserted into the recesses 23 and may be driven into position in any suitable manner, so that the cam-like surfaces 15 engage the chamfered edge portions 25, whereby the teeth 14 will be forced into the sides of the handle 22, as is best shown in Figure 5.

When the plates 11 and 12 are driven almost to the inner end of the recesses 23, the flat end walls 24 will also engage the cam surfaces 15 and will thereby assist in forcing the teeth 14 into the handle.

The wedge plate 18 may be embedded into the end of the handle 22, whereby the latter is spread, so to speak, and urged into stronger and more secure engagement with the teeth 14. The wedging operation is completed by bending the prong 16 and engaging the free end thereof with the aperture 17, while the mid-portion of the prong is received in the recess 19 of the plate 18. It will be observed that in this manner, the plates 11, 12 and 18 will be securely locked together and the wedging action is further enhanced by the embedding of the prong 16 into the end of the handle.

The recess 17' in the plate 12 will, of course, assist in the insertion of the prong 16 into the aperture 17, as will be clearly understood.

It is believed that the advantages and use of the invention will be clearly apparent from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In association with a tool head formed with an eye to receive a handle, a wedging device comprising in combination, bevelled surfaces provided on the opposed sides of the eye in said head, a pair of side plates receivable in said eye between said sides and the sides of said handle, a plurality of in-turned teeth on each of said plates, a tapered wedge plate insertable into the end of said handle, said surfaces forcing said teeth into the sides of said handle, one of said side plates being formed with an aperture, and a prong provided on the remaining of said side plates, the mid-portion of said prong engaging said wedge plate and the end portion of said prong being receivable in said aperture.

VERNIE G. PADGETT.

REFERENCES CITED

The following references are of record in the file of this patent:

UNITED STATES PATENTS

| Number | Name | Date |
|---|---|---|
| 253,279 | Grellner | Feb. 7, 1882 |
| 443,011 | Sill | Dec. 16, 1890 |
| 715,786 | Grellner | Dec. 16, 1902 |
| 739,652 | Dalrymple | Sept. 22, 1903 |
| 1,063,460 | McDonald | June 3, 1913 |